United States Patent [19]
Borghi et al.

[11] 4,340,704
[45] Jul. 20, 1982

[54] THERMOPLASTIC RUBBERS AND PROCESS FOR PREPARING SAME

[75] Inventors: Italo Borghi; Sergio Foschi; Paolo Galli, all of Ferrara, Italy

[73] Assignee: Montedison S.p.A., Milan, Italy

[21] Appl. No.: 145,360

[22] Filed: Apr. 30, 1980

Related U.S. Application Data

[63] Continuation of Ser. No. 16,558, Mar. 1, 1979, Pat. No. 4,298,721, and Ser. No. 807,520, Jun. 17, 1977, abandoned, and Ser. No. 893,400, Apr. 4, 1978, abandoned, each is a continuation of Ser. No. 550,136, Feb. 14, 1975, abandoned.

[30] Foreign Application Priority Data

Feb. 15, 1974 [IT] Italy .............................. 41005 A/74

[51] Int. Cl.$^3$ .............................................. C08F 4/76
[52] U.S. Cl. ................................................... 526/125
[58] Field of Search ....................................... 526/125

[56] References Cited

U.S. PATENT DOCUMENTS

| | | | |
|---|---|---|---|
| 3,789,036 | 1/1974 | Longi | 526/125 |
| 4,013,823 | 3/1977 | Longi | 526/125 |
| 4,107,413 | 8/1978 | Giannini | 526/125 |
| 4,187,196 | 2/1980 | Giannini | 526/125 |

*Primary Examiner*—Paul R. Michl

[57] ABSTRACT

Thermoplastic rubbers comprising propylene-ethylene copolymers containing from 50% to 90% by weight of propylene and showing, on X-rays examination in the unoriented state, crystallinity of the polypropylene and/or polyethylene type are disclosed.

Also disclosed is a method for preparing the thermoplastic rubbers by polymerizing mixtures of propylene and ethylene in the presence of a catalyst obtained by mixing (A) a catalyst-forming component which is (a) an addition and/or substitution product of an electron-donor compound (or a Lewis base) with an Al-trialkyl compound, or (b) the addition reaction product of an electron-donor compound with an Al-alkyl compound containing two or more aluminum atoms bound to each other through an oxygen or nitrogen atom, component (A) being further characterized in that it is prepared by reacting 1.0 mole of an Al-alkyl compound with 0.1–1.0 mole of a Lewis base which is an ester of an organic or inorganic oxygenated acid, a polyamine compound, or any Lewis base other than said esters and polyamine compounds, provided that, in the latter case, component (B) of the catalyst is a complex of a halogenated titanium compound with a polyamine;

and (B) a catalyst-forming component which is the product obtained by contacting an addition compound of a di-, tri-, or tetravalent titanium compound and an electron-donor compound with a carrier consisting of or comprising an anhydrous magnesium dihalide, component (B) being further characterized in that, in its X-rays powder spectrum, a halo appears in place of the most intense diffraction line characteristic of the X-rays powder spectrum of the normal, non-activated magnesium dihalide and, furthermore, in that the amount of Ti compound contained in component (B) and expressed as Ti, is less than 0.3 g. per mole of the total amount of the electron-donor compound used in preparing the catalyst and in that the molar ratio of said Ti compound to the Al-alkyl compound is comprised between 0.001 and 0.1.

7 Claims, No Drawings

THERMOPLASTIC RUBBERS AND PROCESS FOR PREPARING SAME

This is a continuation of application Ser. No. 16,558 issued as U.S. Pat. No. 4,298,721, filed Mar. 1, 1979, and of application Ser. Nos. 807,520 filed June 17, 1977 (now abandoned) and 893,400 filed Apr. 4, 1978, both being in turn continuations of Ser. No. 550,136 filed Feb. 14, 1975 and now abandoned.

THE PRIOR ART

Recently, thermoplastic rubbers have been marketed which consist of a product obtained by partial vulcanization of blends of amorphous ethylene-propylene copolymers, optionally containing a diene, with crystalline alpha-olefin polymers.

In the field of the crystalline copolymers of ethylene with alpha-olefins known so far, the only products that could be of practical interest for use as thermoplastic rubbers consist of A-B-A block copolymers in which A is a polymer block having isotactic structure, e.g., a polypropylene block and B is a block having the structure of a random copolymer of ethylene with an alpha-olefin (Br. Pat. No. 1,134,660).

In said copolymers, the length of the blocks A and B is critical with respect to the elastomeric properties of the final product and therefore the copolymers have to be prepared by very accurate methods. For instance, the method of preparing block copolymers by sequential polymerization of propylene and ethylene, in the presence of stereospecific catalysts based on $TiCl_3$ in the gamma crystalline form, is of no practical value owing to the very low activity of the catalytic system used and, in consequence, the low polymer yields.

It has also been attempted to prepare crystalline block copolymers of ethylene with alpha-olefins by sequential polymerization of ethylene and propylene (or other alpha-olefin) in the presence of catalysts which, in the homopolymerization of propylene, promote the formation of predominantly atactic polypropylene. (U.S. Pat. No. 3,378,606).

The polymers thus obtained give stress-strain curves typical of plastic substances and exhibit elastic properties only after being subjected to plastic deformation. Such products are of no interest as thermoplastic rubbers.

The sequential polymerization of ethylene and propylene in the presence of stereospecific catalysts and operating under conditions such that the polymerization of one of the monomers is conducted in the absence of the other is also known. Plastic polymers are obtained by that process which substantially retain the mechanical properties of crystalline polypropylene even at high contents (about 30%–40% by weight) of polymerized ethylene. (Br. Pat. No. 889,230).

On the other hand, and as is known, (Canadian Pat. No. 677,050) the products obtained by the direct polymerization of mixtures of ethylene and propylene in the presence of $TiCl_3$-based stereospecific catalysts have mechanical properties which are drastically reduced as soon as the content of polymerized ethylene exceeds 10–15% by weight. The decrease in the values for the mechanical properties is so marked that even though the products having the higher polymerized ethylene content (over 10–15% by weight) show an increase in elastic properties, those products are of no practical interest.

According to Br. Pat. No. 856,733, the copolymers obtained by polymerizing mixtures of ethylene and propylene in contact with catalysts prepared from $TiCl_3$ and Al-alkyls in which the alkyl radicals contain more than 3 carbon atoms show a random distribution of the monomer units and exhibit the properties of non-vulcanized rubbers. From the same patent, it is known that by polymerizing the ethylene/propylene mixtures with catalysts which promote the formation of isotactic polypropylene [reference being made to the $TiCl_3/Al(C_2H_5)_3$ system], polymeric products of non-homogeneous composition and comprising considerable amounts of homopolymeric crystalline polypropylene are obtained.

THE PRESENT INVENTION

An object of this invention is to provide new crystalline ethylene/propylene copolymers having, in combination, good elastomeric properties and good mechanical properties, and which are useful as thermoplastic rubbers.

That and other objects are achieved by the present invention which provides new ethylene/propylene copolymers containing from 50% to 90% by weight of propylene and show, on X-rays examination in the unoriented state, crystallinity of the polypropylene and/or polyethylene type, the crystallinity ranging from 3% to 50% and the polyethylene-type crystallinity being less than 20%.

These new copolymers are further characterized in that, in the IR spectra thereof, the ratio R between the absorption intensity of the band at 11.88 microns and the absorption intensity of the band at 12.16 microns ranges from 2 to 7, is less than 4.0 for propylene contents lower than 70% by weight, is comprised between 3 and 6 for propylene contents ranging from 70% to 80% by weight, and is higher than 4.0 for propylene contents exceeding 80% and up to 90%.

The R ratio comprised between the aforementioned values is critical to the combination of good elastic and mechanical properties possessed by the present copolymers.

In fact, the mechanical properties are unsatisfactory when the ratio R is lower than 2.0 and the more unsatisfactory the higher the propylene content of the copolymer. Conversely, the elastic properties of the copolymer are insufficient when the ratio R exceeds 7.0, as occurs when the propylene content is higher than 90% by weight.

The criticality of the R ratio to, and its influence on, the mechanical and elastic properties of the copolymers is explainable considering that the absorption band at 11.88 microns is due to sequences of head-to-tail enchained propylene units having a three-fold helical conformation. A sufficiently high value of the R ratio for a given polymerized ethylene content permits of having crystallizable blocks of sequences of polymerized propylene units and, therefore, a certain propylene-type crystallinity not otherwise possible. A too high R value (as occurs with polymers very righ in propylene) promotes crystallinity of the copolymers on the one hand, and has an adverse affect on the elastic properties thereof, on the other.

It is surprising, and unexpected, that the R ratio can reach the high values stated, if one considers that in the known products obtained by polymerizing ethylene-propylene mixtures, the three-fold helical spiralization of the propylene units is considerably reduced and, in consequence, the R ratio does not reach high values.

As already mentioned hereinabove, the crystallinity exhibited by the present copolymers on X-rays examination (measured on unoriented samples) is comprised between 3% and 50% and is, in general, of polypropylene type, of both polypropylene and polyethylene type or of polyethylene type only. Polyethylene-type crystallinity is less than 20% and generally appears in the products having a propylene content lower than 65% by weight. The behavior of the copolymers of this invention on extraction with solvents depends strictly on the content and type of crystallinity exhibited thereby, as well as on the R ratio values.

By extraction of the crude copolymers with xylene at room temperature, or with heptane at the boiling point, there is obtained an insoluble residue amounting, respectively, to 40–75% and 20–70% by weight of the crude product. This is in contrast to the products obtained by polymerizing ethylene-propylene mixtures known heretofore, and which never resulted in such high percentages of insoluble residue on extraction with xylene at room temperature or with boiling heptane.

The residue of the extraction of the present crude copolymers with both xylene and heptane has a polymerized ethylene content lower than the crude products. Such content generally ranges from 10% to 25% by weight, more particularly from 15% to 25%.

The crystallinity of the residue insoluble in xylene, on X-rays examination and measured on samples in the unoriented state, varies from 30% to 50% and is, in general, of polypropylene type. In the IR spectra of the insoluble residue of the extraction of the crude copolymers of this invention with either xylene at room temperature or with boiling n-heptane, the value of the R ratio is comprised between 4.0 and 7.0, more particularly between 4.5 and 6.0.

The soluble fraction of the copolymers of this invention differs markedly from the insoluble residue, in that the value of the R ratio is much lower (below 1.8) and the mechanical and elastic properties are greatly inferior to those of the insoluble fraction. The polymerized ethylene content of the soluble fraction ranges from 25% to 45% by weight. Generally the soluble fraction does not exhibit any crystallinity at the X-rays. When such crystallinity exists, it is lower than 10–15% and is of the polypropylene type.

Table 1 below reports the value of the R ratio as a function of the propylene content of some copolymers representative of those within the scope of our invention. The mechanical and elastic properties of the copolymers are also tabulated, in order to demonstrate the exceptional combination of values for those characteristics which are attained and distinguish the copolymers of the invention.

TABLE I

| Example | R ratio | Propylene content in % by weight | Tensile strength kg/sq. cm | 300% modulus kg/sq. cm | Elongation at break % | Tens. set % | $[\eta]$ dl/g |
|---|---|---|---|---|---|---|---|
| 3 | 2.46 | 57.9 | 176 | — | 630 | 13 | 8.1 |
| 2 | 3.01 | 66.9 | 118 | 56 | 590 | 16 | 6.7 |
| 1 | 3.55 | 79.3 | 148 | 63 | 770 | 25 | 4.0 |
| 15 | 3.79 | 74.2 | 220 | 72 | 755 | 20 | 6.6 |
| 6 | 4.31 | 83.3 | 172 | 90 | 700 | 33 | — |
| 16 | 4.75 | 79 | 168 | 114 | 575 | 28 | 6.1 |

TABLE I-continued

| Example | R ratio | Propylene content in % by weight | Tensile strength kg/sq. cm | 300% modulus kg/sq. cm | Elongation at break % | Tens. set % | $[\eta]$ dl/g |
|---|---|---|---|---|---|---|---|
| 16 | 5.77 | 81.7 | 192 | 90 | 735 | 34 | 6.7 |

The copolymers having the most desirable combination of mechanical and elastic properties generally have a polymerized propylene content of from 55% to 70% by weight and an R ratio of from 2.2 to 3.5. Products containing from 70% to 80% by weight of polymerized propylene and the R ratio of which is from 3.5 to 5.0 are also valuable.

As indicated in the foregoing Abstract Of Disclosure, the copolymers of the invention are prepared by polymerizing mixtures of propylene and ethylene in contact with a catalyst consisting of the product obtained by mixing (A) a catalyst-forming component which is (a) the addition and/or substitution reaction product of an electron-donor compound (or Lewis base) with an Al-trialkyl compound, or (b) an addition reaction product of an electron-donor compound with an Al-alkyl compound containing two or more aluminum atoms bound to each other through an oxygen or nitrogen atom, with (B) a catalyst-forming component which is the product obtained by contacting an addition compound of a halogenated di-, tri-, or tetravalent titanium compound and an electron-donor compound with a carrier consisting of or comprising an anhydrous magnesium dihalide.

Catalyst-forming component (A) is further characterized in that it is prepared by reacting 1.0 mole of Al-alkyl compound with 0.1 to 1.0 mole of a Lewis base which is an ester of an organic or inorganic oxygenated acid, a polyamine compound, or any Lewis base other than said esters and polyamine compounds provided that, in the latter case, catalyst-forming component (B) is obtained from a complex of a halogenated Ti compound with a polyamine.

Catalyst-forming component (B) is further characterized in that, in its X-rays powder spectrum, a halo appears in place of the most intense diffraction line characteristic of the X-rays powder spectrum of the normal, non-activated magnesium dihalide and, also, in that the amount of Ti compound contained in component (B) and expressed as Ti, is less than 0.3 g. per mole of the total amount of electron-donor compound used in preparing the catalyst, and in that the molar ratio of the Ti compound to the Al-alkyl compound is comprised between 0.001 and 0.1.

By "the addition or substitution reaction product of an electron-donor compound" with an Al-alkyl compound as specified for catalyst-forming component (A) is meant a product consisting of or comprising, respectively, a complex of the electron-donor compound with the Al-alkyl compound and the product of the reaction of an Al-trialkyl with an electron-donor compound containing activated hydrogen atoms capable of reacting with the trialkyl Al according to a substitution reaction represented, for example, by

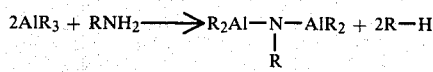

Any electron-donor compound (or Lewis base) capable of forming an addition and/or substitution compound with the Al-alkyl compounds specified in (a) or (b) can be used to obtain catalyst-forming component (A).

Examples of such electron-donor compounds are: amines, amides, ethers, esters, ketones, nitriles, phosphines, stibines, arsines, phosphoramides, thioethers, thioesters, aldehydes, alcoholates, amides and salts of the organic acids of Groups I to IV inclusive of the Mendelyeev Periodic System.

The best results have been obtained by using component (A) in the form of an addition product of an Al-trialkyl compound with an electron-donor compound which is an ester or polyamine compound. Examples of such compounds which are useful in preparing catalyst-forming component (A) are: ethyl benzoate, paramethoxyethyl benzoate, diethyl carbonate, ethyl acetate, N,N',N'-tetramethylethylene diamine, 1,2,4-trimethylpiperazine, dimethylmaleate, triethylborate, ethyl-o-chlorobenzoate, ethylnaphthoate, ethyltoluate, ethyl-p-butoxybenzoate, ethylcyclohexonoate and ethylpivolate.

The presently preferred Lewis/base organic Al compound molar ratio in component (A) is less than 1.0, and is comprised between 0.3 and 0.5 when the base is an ester or a diamine.

The following Al-trialkyl compounds are particularly suitable for use in preparing catalyst-forming component (A):

$Al(C_2H_5)_3$; $Al(CH_3)_3$; $Al(nC_3H_7)_3$; $Al(iC_4H_9)_3$.

Examples of other useful Al-trialkyls are:

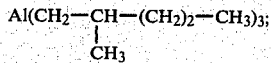

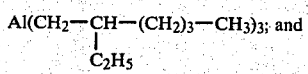

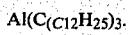

The organometallic compounds containing two or more Al atoms bound to each other through an oxygen or nitrogen atom are obtained by reacting an Al-trialkyl compound with water, ammonia or a primary amine, by conventional methods.

Some examples of such compounds which are useful in preparing catalyst-forming component (A) are:

and

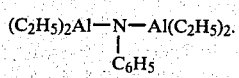

Component (A) of the catalyst can be obtained by various methods. In one preferred method, the electron-donor compound is reacted with an organic Al compound in the proper molar ratio before it is mixed with component (B). In an alternative method, component (A) is prepared in situ by reacting the Al-trialkyl compound with component (B) and then adding the base to the mixture in an amount such as to form component (A).

The electron-donor compounds used to prepare component (B) may be the same as those specified for use in preparing component (A), or different. Also, in preparing component (B) any electron-donor capable of forming a complex with a halogenated Ti compound can be used except that when the compound used to prepare component (A) is either an ester, a diamine, or a polyamine compound, the electron-donor used in preparing component (B) is a diamine or a polyamine.

Electron-donor compounds useful in preparing component (B) are, for example: N,N,N'N'-tetramethylethylene diamine, veratrol, ethylbenzoate, acetone, 2,5-hexandione, dimethylmaleate, dimethylmalonate, tetrahydrofurfurylmethyl ether, nitrobenzene, diethyl carbonate, acetophenone, 1,2,4-trimethylpiperazine, and ethyl acetate.

Diamines are particularly suitable for use in preparing component (B). Esters also give excellent results when the base used for preparing component (A) is an ester or a diamine.

The useful Ti compounds include any halogenated compound of divalent, trivalent or tetravalent titanium. Examples are:

$TiCl_4$, $TiCl_3$, $TiI_4$, $Ti(OC_3H_7)CL_3$, $Ti(OC_4H_9)_2Cl_2$,
$3TiCl_3.AlCl_3$,
$Ti[O-C(CH_3)=CH-CO-CH_3]_2Cl_2$,
$Ti[N(C_2H_5)_2]Cl_3$, $Ti[N(C_6H_5)_2]Cl_3$,
$Ti(C_6H_5COO)Cl_3$, $[N(C_4H_9)_4]_2TiCl_6$,
$[N(CH_3)_4]Ti_2Cl_9$, $TiBr_4$, $TiCl_3OSO_2C_6H_5$,
$LiTi(OC_3H_7)_2Cl_3$.

Catalyst-forming component (B) can be prepared by various methods. One presently preferred method consists in contacting the magnesium dihalide with a halogenated Ti compound previously complexed with the base under conditions such that the resulting product has a surface area exceeding 3 m²/g. Said result can be achieved, for instance, by dry-cogrinding (in the absence of solvents) the carrier with the halogenated Ti compound/base complex.

Component (B) can also be obtained by grinding the complex with a pre-activated magnesium dihalide having a surface area higher than 3 m²/g.

Generally, the surface area of component (B) is larger than 3 m²/g and ranges, more particularly, from 20 to 50 m²/g.

Examples of addition Ti compounds for use in preparing component (B) are:

$TiCl_4.C_6H_5COOC_2H_5$; $TiCl_4.2C_6H_5COOC_2H_5$;
$TiCl_4.pCH_3OC_6H_4COOC_2H_5$; $TiCl_4.C_6H_5NO_2$;
$TiCl_3.(CH_3)_2N-(CH_2)_2N(CH_3)_2$;
$TiCl_4(CH_3)_2N(CH_2)_2N(CH_3)_2$;
$TiCl_4.CH_3COC_2H_5$; $TiCl_4.2C_4H_8O$;
$TiCl_3.C_6H_5COOC_2H_5$.

The amount of Ti compounds present on the carrier is generally comprised between 0.1 and 10% by weight expressed as metallic titanium.

The Ti/base/Al molar ratio preferably varies from 1:20:40 to 1:200:600. The magnesium dihalide contained in the catalysts used in the practice of this invention, and which dihalide is in activated state, is characterized in that it has a surface area larger than 3 m²/g and/or in that in its X-rays powder spectrum a halo appears in place of the most intense diffraction line which is present in and characteristic of the X-rays powder spectrum of the normal, non-activated magnesium dihalide.

The preferred method of activating the Mg dihalide consists in subjecting the normal, non-activated Mg dihalide to grinding by known technologies. The grinding, in the present or absence of the Ti compound/base complex, is preferably conducted in the dry state in a ball mill, i.e., in the absence of liquid diluents.

Anhydrous compounds of elements belonging to Groups I to IV of the Mendelyeev Periodic System different from the Mg dihalide can be mixed with the latter without substantially reducing the activity of the final catalysts. To avoid any substantial modification of the catalyst activity, the anhydrous compound of Groups I to IV mixed with the Mg dihalide must be one which does not interact with the Mg dihalide. Typical examples of such compounds useful as diluents of the Mg dihalide are:

$LiCl, CaCO_3, CaCl_2, SrCl_2, BaCl_2, Na_2SO_4,$
$Na_2CO_3, LiCrO_4, Na_2B_4O_7, Ca_3(PO_4)_2, CaSO_4,$
$BaCO_3, Al_2(SO_4)_3, B_2O_3, Al_2O_3, SiO_2,$ etc.

The amount of such anhydrous diluents mixed with the anhydrous Mg dihalide can vary within wide limits, and may be, for example, from 30% to 70% by weight of the mixture.

The preferred catalysts for use in preparing the thermoplastic rubbers of the invention are obtained by mixing (A) an Al-trialkyl compound, in particular Al-triethyl or Al-triisobutyl, complexed with 0.1–0.4 moles of an ester of an aromatic acid, such as, for instance, ethyl or butyl benzoate, or ethyl-p-methoxybenzoate with (B) the product obtained by supporting a 1:1 or 1:2 complex of Ti $Cl_4$ or Ti $Cl_3$ and an ester of an aromatic acid, in particular ethyl or butyl benzoate or ethyl-p-methoxybenzoate on active Mg $Cl_2$, the ratio of g-atoms of Ti to the moles of total ester employed in preparing the catalyst being comprised between 0.05 and 0.005, and component (B) being characterized in that, in its X-rays powder spectrum, a halo appears in place of the most intense diffraction line of the X-rays powder spectrum of normal, non-active Mg $Cl_2$.

Component (B) is obtained by preparing the Ti $Cl_4$ or Ti $Cl_3$ organic ester complex by known methods and subsequently cogrinding the complex and Mg $Cl_2$ until the halo appears in the X-rays powder spectrum of the coground mixture.

The ethylene-propylene mixtures are polymerized with the catalysts aforesaid at a temperature ranging from −10° C. to +80° C., preferably from 0° C. to +40° C., preferably utilizing liquid propylene as the polymerization medium. It is possible, however, to polymerize the ethylene-propylene mixtures with said catalysts in an inert hydrocarbon medium such as hexane, heptane, cyclohexane, benzene, toluene, etc. In this last-mentioned embodiment, the polymerization is preferably carried out at temperatures ranging from 40° C. to 80° C.

To obtain products having a composition as homogeneous as possible, the concentration of the monomers must be kept constant during the polymerization.

The molecular weight of these ethylene-propylene copolymers useful as thermoplastic rubbers can be regulated by conducting the ethylenepropylene copolymerization in the presence of known molecular weight-regulating agents such as, for example, hydrogen. The copolymers having the best elastic and mechanical properties have an intrinsic viscosity, measured in tetralin at 135° C., exceeding 2.0 and, in general, from 2.0 to 8.0 dl/g.

If it is desired to introduce sites of unsaturation into the ethylene-propylene copolymers for the purpose of imparting particular reactivity characteristics thereto, the polymerization of the ethylene and propylene can be conducted in the presence of hydrocarbons containing at least two double bonds and which are copolymerizable with the ethylene and propylene. For such purposes there may be employed the dienes and polyenes used in preparing the known EPDM rubbers to render the same vulcanizable with sulphur. The unsaturated hydrocarbon content of the present ethylene-propylene copolymers can range from 0.5% to 10% by weight.

The present copolymers are recovered from the reaction medium and dried according to the technology which is usual in the field of olefin polymers and copolymers.

In general, because of the high activity of the catalysts used in producing the new ethylene-propylene copolymers, it is not necessary to purify the copolymers from catalyst residues.

Other finishing operations (homogenization and granulation) are carried out on the present copolymers according to conventional technology.

The fillers commonly employed in the rubber field can be incorporated in the copolymers of this invention. Moreover, pigments, stabilizers, lubricants and other conventional adjuvants, as well as polymers such as polyethylene and polypropylene, can be incorporated in these copolymers.

The present copolymers can be formed into shaped articles by the methods used for molding thermoplastic rubbers. In comparison with vulcanized rubbers, the present copolymers have the great advantage of not requiring vulcanizing treatments and of permitting, in consequence, a reutilization of the processed material and scraps.

The new copolymers are particularly adapted to use in the manufacture of shoe soles; automobile parts, such as, for example, bumpers, pipes, gaskets and flexible joints; sports articles, such as helmets, flippers, underwater masks, etc.

The following examples are given to illustrate the invention in more specific detail and are not intended to be limiting. Unless otherwise specified, the amounts given in the examples are by weight; the tensile strength, elongation at break, 300% modulus and tension set at 75% were determined according to ASTM D 412; the hardness Shore A was determined according to ASTM D 676. The specimens were cut from a plate compression molded in a press at 150° C. for 15 minutes and subsequently cooled for 10 minutes with circulating water. The intrinsic viscosity [$\mu$] was mesured in tetralin at 135° C. with a polymer concentration of 0.1% by weight.

The ratios R in the IR spectra were determined on a polymer lamina having a thickness of about 0.10–0.15 mm, prepared by compression molding in a nitrogen atmosphere at approx. 160° C. and then gradually cooled to about 90° C. between the plates of the press and under a slight nitrogen flow. The absorption spectra of the specimens in the range from 10.6 to 13.2 microns was recorded by means of a spectrophotometer. For the calculation, a base line was drawn tangential to the spectrum in the two maximum transmission points, one being placed at around 11.35 microns and the other at around 12.9 microns. The absorbance was then measured with respect to said base line at 11.88 microns (minimum transmission point) and at 12.16 microns. An instrument with optics in Na Cl or equivalent (e.g., a Perkin-Elmer spectrophotometer Model 221) is used.

The percent of polymerized ethylene in the copolymers was determined by the spectrophotometric method on a copolymer lamina having a thickness of from 0.01 to 0.05 cm and obtained by compression molding. Recording occurs in a cell heated at 120° C., the instrument being of the same type as used to determine the R ratio. The absorption curves in the zone between 12.5 and 15.0 microns are recorded, the following formula being utilized in making the calculation:

$$(D13.30 + D13.70 + D13.90)/1.09.S$$

wherein D13.30, D13.70 and D13.90 are the optical densities at 13.30, 13.70 and 13.90 microns, respectively, and S is the thickness of the specimen in centimeters. The optical densities are calculated with respect to a base line tangential to the spectrum in the two maximum transmission points, one placed at around 12.9 microns and the other at around 14.6 microns. The thickness of the lamina must be such that the transmission in the point of minimum transparency is not less than 20%. The X-rays measurement for determining the crystallinity content and type is carried out on a lamina molded in a press at 150° C. in a nitrogen atmosphere, annealed for one hour at 100° C., and then gradually cooled down.

EXAMPLE 1

To a solution of 83 g of Ti Cl$_4$ in 450 ml of n-hexane there is added, in 60 minutes at 70° C., a solution of ethyl benzoate (EB) in n-hexane (1/1 by volume) in such amount as to have a Ti Cl$_4$/EB final ratio=1.2 moles. The reaction is carried on for a further 60 minutes. The solution is evaporated to dryness at 50° C.

The complex formed (250 g) is co-ground for 36 hours with anhydrous Mg Cl$_2$ (1,000 g) in a vibrating ball mill having a 6 liters capacity. The Ti content in the ground product is about 3% by weight.

5,000 cc of propylene are introduced into a stainless steel 6 liters autoclave, shell-thermoregulated, deaerated, provided with sable agitator, thermometer well, pressure gauge and sample plug for gas-chromatographic analysis. The temperature in the autoclave is brought to 10° C. Ethylene is introduced through a dipping pipe until a pressure of 7.3 atm is reached, and the temperature is kept constant at 10° C.

Separately, a 2% solution of a mixture consisting of 5.7 g (50 millimoles) of Al-triethyl and of 3.35 g (18.3 millimoles) of ethylanisate in n-hexane is prepared. This solution is allowed to react at room temperature for 25 minutes before use, then it is introduced into the autoclave under an inert gas pressure. 0.4 g of a powder prepared by grinding, as described herein above, the Ti Cl$_4$.ethyl benzoate complex along with Mg Cl$_2$, are suspended in 35 cc of n-hexane, and then introduced under pressure into the autoclave.

During the reaction, the pressure is maintained constant by feeding ethylene. After 60 minutes the reaction is stopped by addition of 50 cc of methanol and the polymer, discharged from the autoclave in the form of a powder, is freed from the solvent contained in it by steam injection. 400 g of polymer are thus obtained, the yield being 33,300 g per gram of metallic Ti. The polymer is mixed with 0.2% by weight of stabilizer [n-octadecyl (4-hydroxy-3,5'-ditert.-butyl-phenyl) propionate (Irganox 1076)] in a calender and homogenized for about 10 minutes at an average temperature of 120° C.

The tests for determining the mechanical properties, the infrared test, the determination of the intrinsic viscosity, of the insolubility in xylene at room temperature, of the crystallinity at X-rays are carried out on specimens prepared according to the known techniques.

The mechanical characteristics are as follows:

| Tensile strength | 148 kg/sq. cm |
|---|---|
| Elongation at break | 770% |
| Modulus at 300% | 63 kg/sq. cm |
| Tension set at 75% | 27% |
| Mooney viscosity (5 + 5) at 190° C. | 34 |
| SHORE A hardness at 23° C. | 85 |
| SHORE A hardness at 150° C. | 10 |

The other characteristics of the polymer are:
[η]=4.0 dl/g
Ethylene content=20.7% by weight
R ratio=3.55
Polypropylene-type crystallinity at X-rays=32%; polyethylene-type crystallinity is not detectable.
By extraction with xylene at 23° C., a soluble fraction (57.2%) and an insoluble residue (42.8%) are obtained. By extraction with n-heptane at the boiling point, the soluble fraction amounts to 61.5%, while the residue amounts to 38.5%. The residue in xylene exhibits the following characteristics:
[η]=4.9 dl/g
Ethylene content=15.1% by weight
R ratio=5.45
Polypropylene-type crystallinity=50%; (no polyethylene-type crystallinity is detectable).
The characteristics of the fraction soluble in xylene are as follows:
[η]=3.5 dl/g
Ethylene content=29.6%
R ratio=1.74
Polypropylene-type crystallinity=less than 10%; (no polyethylene-type crystallinity is detectable).

EXAMPLE 2

Example 1 is repeated, but using a pressure of 8 atm. instead of 7.3 and employing 0.240 g of a catalytic component consisting for 0.051 g of the Ti Cl$_4$.ethyl benzoate complex and for 0.189 g of Mg Cl$_2$. At the end of the reaction, the procedure is the same as in Example 1.

The mechanical characteristics of the polymer obtained are as follows:

| Tensile strength | 118 kg/sq. cm |
|---|---|
| Elongation at break | 590% |
| Modulus at 300% | 56 kg/sq. cm |
| Tension set at 75% | 16% |
| SHORE A hardness at 23° C. | 80 |

| -continued | |
|---|---|
| SHORE A hardness at 150° C. | 14 |

The intrinsic viscosity [η] is 6.7 dl/g. The crystallinity due to propylene units at the X-rays is 20%. The ethylene percentage in the crude amounts to 33.1% by weight and in the residue to 15.1% by weight. The residue in xylene at 23° C. is 43.7% by weight. The R ratio in the crude product is 3.1, while in the residue it is 4.1. The fraction soluble in xylene contains 63.2% by weight of ethylene; no crystallinity is detectable at the X-rays.

EXAMPLE 3

A stainless steel autoclave having a capacity of 20 l, of which 15 l are useful, provided with a thermoregulation system, a comb-type stirrer, a thermometer well and a sample plug for gas-chromatographic analysis is used. The autoclave, which is operated continuously, is fed with propylene, ethylene, solvent and catalysts and discharges from the bottom the polymer and the unconverted monomers, so as to maintain the level constant. The polymer discharged from the bottom is separated from the monomers in a collecting tank containing water kept at 100° C. In such container the monomers are distilled off, while the polymer is extracted along with the water in the form of a dispersion. The reactor described hereinbefore is fed with the component of the catalyst system in the following way:

A 10% solution of Al Et$_3$ in n-hexane along with a 2% solution of MB (methyl benzoate) in n-hexane is introduced into the reactor through a small-diameter piping. The average residence time in the piping (kept at room temperature) is about 26 minutes. Immediately before the inlet into the reactor, a 2% suspension in n-hexane of a product consisting of Ti Cl$_4$-EB (ethyl benzoate) coground with Mg Cl$_2$ is fed to the piping (Ti in the coground product amounts to 3% by weight; grinding time is 36 hours).

The autoclave operating conditions are as follows:

| Temperature | about 13° C. |
|---|---|
| Pressure | 9.5 atm. (abs.) |
| Residence time | about 104 minutes. |

The feeding flow is made up as follows:

| Propylene | 3.62 kg//h |
|---|---|
| Ethylene | 0.568 kg/h |
| n-hexane | 0.410 kg/h |
| AlEt$_3$ | 9.31 g/h |
| MB | 5.75 g/h |
| TiCl$_4$ − EB + MgCl$_2$ | 0.321 g/h |

The Al Et$_3$/MB molar ratio is 1.94. The Al/Ti molar ratio is 406. The time required by the test is 13.5 hours. 10 kg of polymer are obtained, the yield being 76,923 g of polymer/g of titanium.

Product characteristics:

| Ethylene content | = 42.1% by weight |
|---|---|
| Polypropylene-type crystallinity under X-rays | = 7.5% |
| Polyethylene-type crystallinity | = 5% |
| [η] | = 8.1 dl/g |
| Mooney viscosity (5' + 5') at 190° C. | |
| R ratio | = 2.46 |

Mechanical characteristics:

| Tensile strength | = 176 kg/sq. cm |
|---|---|
| Elongation at break | = 630% |
| Tension set at 75% | = 13% |
| SHORE A hardness at 23° C. | |
| SHORE A hardness at 150° C. | = 20. |

EXAMPLE 4

The test of Example 3 has been repeated, but varying the operating conditions as follows:

Running conditions:

| temperature | = 15° C. |
|---|---|
| pressure | = 9.5 atm. abs. |
| residence time | = 88 minutes |

Feeding:

| propylene | = 3.95 kg/h |
|---|---|
| ethylene | = 0.515 kg/h |
| n-hexane | = 0.846 kg/h |
| hydrogen | = 1.25% by moles in the gas phase |
| AlEt$_3$ | = 9.456 g/h |
| MB | = 3.877 g/h |
| TiCl$_4$ − EB + MgCl$_2$ | = 0.756 g/h |
| AlEt$_3$/MB molar ratio | = 2.91 |
| Al/Ti molar ratio | = 175 |

The polymerization time is 12 hours. 10.9 kg of polymer are obtained, the yield being 40,000 g/g of titanium.

Characteristics of the product:

| Ethylene content | = 36.7% by weight |
|---|---|
| Propylene-type crystallinity under X-rays | = 10% |
| Polyethylene-type crystallinity | = traces |
| [η] | = 3.8 dl/g |
| Mooney viscosity (5' + 5') at 190° C. | = 46 |
| R ratio | = 3.45 |
| Tensile strength | = 126 kg/sq. cm |
| Elongation at break | = 730% |
| Tension set at 75% | = 27% |
| SHORE A hardness at 23° C. | = 84 |
| SHORE A hardness at 150° C. | = 16. |

EXAMPLES 5 to 10

5,000 cc of propylene are introduced into the 6 l autoclave of Example 1. The autoclave temperature is brought to the pre-fixed temperature, whereupon the ethylene overpressure specified in Table 2 is introduced. The catalyst is then introduced, having been separately prepared following the modalities specified in Example 1, starting from 50 millimoles of aluminum triethyl, ethylanisate in an amount equal to an Al Et$_3$/ethylanisate molar ratio of 2.73, and 0.15 millimoles of Ti Cl$_4$.ethyl benzoate complex supported on Mg Cl$_2$. In Examples 9 and 10, hydrogen in a percentage of 1% and 3% by volume respectively was introduced along with ethylene. Both reaction conditions and results obtained are reported in Table 2.

TABLE 2

| | | Examples | | | | | |
|---|---|---|---|---|---|---|---|
| | | 5 | 6 | 7 | 8 | 9 | 10 |
| Ethylene overpressure | atm. | 0.5 | 0.5 | 1.0 | 1.2 | 1.2 | 1.2 |
| Hydrogen | % by vol. | — | — | — | — | 1 | 3 |
| Temperature | °C. | 0 | 20 | 20 | 10 | 10 | 10 |
| Reaction time | minutes | 75 | 70 | 60 | 60 | 60 | 60 |
| Polymer yield | g/g Ti | 9000 | 25000 | 4100 | 34000 | 33000 | 28000 |
| Ethylene content | % by wt. | | 16.7 | 35.8 | 32.7 | 34.3 | 35.9 |
| Crystallinity under X-rays | | | | | | | |
| polyethylene-type | % | traces | traces | traces | non-detect | traces | non-detect |
| polypropylene-type | % | 30 | 34 | 20 | 15 | 10 | 5 |
| [η] | dl/g | 6.8 | 4.8 | 7.7 | 5.9 | 3.6 | 3.3 |
| ML viscosity (5′ + 5′) at 190° C. | | | | | | 40 | 28 |
| R ratio | | | 4.31 | | 2.44 | | |
| Fraction insoluble in xylene at 23° C. | % | | 61 | | | | |
| R ratio of the insoluble residue | | | 6.31 | | | | |
| Tensile strength | kg/sq. cm | 149 | 172 | 106 | 158 | 112 | 102 |
| Elongation at break | % | 580 | 700 | 340 | 660 | 760 | 740 |
| Modulus at 300% | kg/sq. cm | 75 | 90 | 94 | 64 | 46 | 48 |
| Tension set at 75% | % | 18 | 33 | 20 | 16 | 29 | 28 |
| SHORE A hardness | | | | | | | |
| at 23° C. | | 87 | 82 | 87 | 82 | 83 | 85 |
| at 150° C. | | 18 | 11 | 23 | 15 | 15 | 12 |

EXAMPLE 11

The test of Example 6 has been repeated, but using methyl benzoate instead of ethylanisate in an amount corresponding to an Al Et3/methyl benzoate molar ratio equal to 3, and employing a reaction time of 60 minutes instead of 70 minutes.

The polymer yield obtained amounts to 25,000 grams per gram of metallic Ti.

Product characteristics:

| | |
|---|---|
| Ethylene content | = 22.6% by weight |
| Crystallinity under X-rays: | |
| of the polypropylene type | = 15% |
| of the polypropylene type | = non detectable |
| [η] | = 5.0 dl/g |
| Mooney viscosity (5 + 5) at 190° C. | = 41 |
| R ratio | = 3.89 |

Mechanical characteristics:

| | |
|---|---|
| Tensile strength | = 147 kg/sq. cm |
| Elongation at break | = 710% |
| Modulus at 300% | = 79 kg/sq. cm |
| Tension set at 75% | = 30% |
| SHORE A hardness at 23° C. | = 90 |
| SHORE A hardness at 150° C. | = 12 |

EXAMPLES 12 to 14

A stainless steel 2 l autoclave, shell-thermoregulated, deaerated, provided with stirrer, thermometer well, pressure gauge and sample plug for gas-chromatographic analysis, is fed with a pre-fixed amount of propylene and, in Examples 13 and 14, of n-heptane. The autoclave is brought to a constant temperature, whereupon an ethylene overpressure as indicated on Table 3 is introduced. Following the modalities specified in Example 1, a catalyst, prepared separately under the conditions of Example 1 and consisting of 10 millimoles of aluminum triethyl, 3.66 millimoles of ethyl anisate and 0.05 millimoles of a Ti Cl4.ethyl benzoate complex supported on Mg Cl2, is introduced into the autoclave.

Reagents amounts, reaction conditions and results obtained are reported in Table 3.

TABLE 3

| | | Examples | | |
|---|---|---|---|---|
| | | 12 | 13 | 14 |
| Propylene | cc | 800 | 450 | 450 |
| n-heptane | cc | — | 200 | 200 |
| Ethylene overpressure | atm. | 0.5 | 1.0 | 0.5 |
| Temperature | °C. | 40 | 60 | 60 |
| Reaction time | minutes | 60 | 60 | 60 |
| Polymer yield | g/g Ti | 50000 | 15000 | 23000 |
| Ethylene content | % by weight | 13.4 | 32.3 | 25.3 |
| Cystallinity under X-rays: | | | | |
| of polyethylene type | % | non-detect. | non-detect. | traces |
| of polypropylene type | % | 25 | 15 | 10 |
| [η] | dl/g | 8.8 | 5.6 | 4.6 |
| Tensile strength | kg/sq. cm | 200 | 160 | 107 |
| Elongation at break | % | 695 | 730 | 770 |
| Modulus at 300% | kg/sq. cm | 102 | 65 | 41 |
| Tension set at 75% | % | 39 | 19 | 20 |

EXAMPLE 15

Example 6 is repeated, but employing a temperature of −10° C. instead of +20° C. and a reaction time of 150 minutes instead of 70 minutes. 38,000 grams of polymer per gram of metallic Ti are obtained.

Product characteristics:

| | |
|---|---|
| Ethylene content | = 25.8% by weight |
| Crystallinity at X-rays | |
| of polypropylene type | = 15% |
| of polyethylene type | = non-detectable |
| [η] | = 6.6 dl/g |
| R ratio | = 3.79 |

The soluble fraction obtained by extraction with n-heptane at the boiling point amounts to 48.3%, while the residue amounts to 51.7%. The residue of the n-heptane extraction has an ethylene content of 19.5%.

The mechanical characteristics of the crude product are as follows:

| tensile strength | 220 kg/sq. cm |
|---|---|
| elongation at break | 755% |
| modulus at 300% | 72 kg/sq. cm |
| tension set at 75% | 20% |
| SHORE A hardness at 23° C. | 85 |
| SHORe A hardness at 150° C. | 10 |

EXAMPLE 16

A continuous test under the conditions specified hereinbelow has been conducted in a 20 l autoclave as described in Example 3.

Running conditions:

| temperature | = about 21.4° C. |
|---|---|
| pressure | = 9.5 atm. (abs.) |
| residence time | = 90 minutes |

Feeding:

| propylene | = 3.761 kg/h |
|---|---|
| ethylene | = 0.334 kg/h |
| n-hexane | = 0.680 kg/h |
| AlEt$_3$ | = 7.700 g/h |
| ethyl anisate | = 6.320 g/h |
| TiCl$_4$ . ethyl benzoate + MgCl$_2$ | = 0.487 g/h |
| AlEt$_3$/ethyl anisate molar ratio | = 1.92 |

The catalyst was prepared under the conditions of Example 1. The test was conducted for 12 hours. The polymer yield was 7,963 g/g of Ti.

The characteristics of the product are as follows:

| [$\eta$] | = 6.1 dl/g |
|---|---|
| R ratio | = 4.75. |

Mechanical characteristics:

| tensile strength | 168 kg/sq. cm |
|---|---|
| elongation at break | 575% |
| modulus at 300% | 114 kg/sq. cm |
| tension set at 75% | 28% |
| SHORE A hardness at 23° C. | 90 |
| SHORE A hardness at 150° C. | 16 |

Other characteristics of the polymer are:

| ethylene content | 21% by weight |
|---|---|
| crystallinity under X-rays: | |
| of polypropylene type | = 34% |
| of polyethylene type | = not detectable. |

By extraction with xylene at 23° C., a soluble fraction (38.1%) and a residue (61.9%) are obtained. The residue in xylene exhibits the following characteristics:

| ethylene content | = 18.3% by weight |
|---|---|
| R ratio | = 5.77 |
| tensile strength | = 192 kg/sq cm |
| elongation at break | = 735% |
| Elastic modulus at 300% | = 90 kg/sq. cm |
| tension set at 75% | = 34% |

The ethylene content of the soluble fraction amounts to 29% by weight.

By extraction with n-heptane, an soluble fraction (53.6%) and a residue (46.4%) are obtained. The residue of the n-heptane extraction at the boiling point exhibits the following characteristics:

| [$\eta$] | = 6.7 dl/g |
|---|---|
| crystallinity at X-rays: | |
| of polypropylene type | = 32% |
| of polyethylene type | = non-detectable. |

The characteristics of the fraction soluble in n-heptane at the boiling point are as follows:

| [$\eta$] | = 5.5 dl/g |
|---|---|
| crystallinity at X-rays: | |
| of polypropylene type | = 10% |
| of polyethylene type | — non-detectable. |

What we claim is:

1. Process for preparing thermoplastic rubbers which are copolymers of propylene with ethylene containing from 25% to 50% by weight of polymerized ethylene and the balance polymerized propylene, said copolymers showing on X-rays examination in the unoriented state a polypropylene-type and/or a polyethylene-type crystallinity, the polypropylene crystallinity content ranging from 3 to 50% and the polyethylene-type crystallinity being less than 20%, said copolymers being further characterized in that in the infrared spectrum thereof the value of the R ratio between the absorption intensity of the band at 11.88 microns and that of the absorption at 12.16 microns is from 2 to 6, the R ratio being less than 4 when the polymerized propylene content of the polymers is lower than 70% by weight, comprised between 3 and 6 when the polymerized propylene content ranges from 70 to 80% by weight, characterized in that mixtures of propylene and ethylene are polymerized in the presence of a catalyst consisting of the product obtained by reacting (A) a catalyst-forming component which is an addition and/or substitution reaction product of an electron-donor compound (or Lewis base) with an Al-trialkyl compound, or the addition reaction product of an electron-donor compound with an Al-alkyl compound containing two or more aluminum atoms bound to each other through an oxygen or nitrogen atom, with (B) a catalyst-forming component obtained by contacting an addition compound of a halogenated compound of di-, tri-, or tetravalent titanium and an electron-donor compound with a carrier comprising an anhydrous active magnesium dihalide, said component (A) being characterized in that it is prepared by reacting 1.0 mole of Al-alkyl compound with 0.1 to 1.0 mole of a Lewis base which is an ester of an oxygenated organic or inorganic acid, a polyamine compound, or, when catalyst-forming component (B) is prepared starting from a complex of a halogenated titanium compound with a polyamine, any Lewis base other than said esters of oxygenated organic or inorganic acids and polyamine compounds, and catalyst-forming component (B) being characterized in that, in its X-rays powder spectrum, a halo appears in place of the most intense diffraction line characteristic of the X-rays powder spectrum of the normal, non-active magnesium dihalide, in that the amount of Ti compound contained therein, expressed as Ti metal, is less than 0.3 g-atoms per mole of the total amount of the electron-donor used in preparing the catalyst, and in that the molar ratio between said Ti compound and the Al-alkyl compound is from 0.001 to 0.1.

2. The process of claim 1, in which the carrier comprises the activated Mg dihalide mixed with 30% to 70% by weight of a compound of an element belonging to one of Groups I to IV of the Mendelyeev Periodic System different from the activated Mg dihalide and substantially non-reactive therewith.

3. The process of claim 1, in which the carrier comprises activated $MgCl_2$.

4. The process of claim 3, in which the activated $MgCl_2$ is mixed with from 30% to 70% by weight of a compound of an element belonging to Groups I to IV of the Mendelyeev Periodic System different from the activated $MgCl_2$ and substantially non-reactive therewith.

5. The process of claim 1, in which the electron-donor compound of both component (A) and component (B) of the catalyst is an ester of benzoic acid or of its derivatives and the Ti/ester molar ratio is comprised between 0.005 and 0.05.

6. The process of claim 1, in which the polymerization is conducted in liquid propylene at a temperature between $-10°$ C. and $+80°$ C.

7. The process of claim 1, in which the polymerization is conducted in the presence of small amounts of a hydrocarbon containing at least two double bonds.

* * * * *